US010127815B2

(12) United States Patent
Hernandez et al.

(10) Patent No.: US 10,127,815 B2
(45) Date of Patent: Nov. 13, 2018

(54) METHOD AND DEVICE FOR SETTING UP A MOVEMENT MODEL OF A ROAD USER

(71) Applicant: Robert Bosch GmbH, Stuttgart (DE)

(72) Inventors: Alberto Ranninger Hernandez, Madrid (ES); Christian Braeuchle, Hassmersheim-Hochhausen (DE); Folko Flehmig, Stuttgart (DE); Miguel Angel Granda Trigo, Madrid (ES); Roland Galbas, Ludwigsburg (DE); Felipe Fernandez Hernandez, Madrid (ES)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/513,210

(22) PCT Filed: Jul. 30, 2015

(86) PCT No.: PCT/EP2015/067517

§ 371 (c)(1),
(2) Date: Mar. 22, 2017

(87) PCT Pub. No.: WO2016/045832

PCT Pub. Date: Mar. 31, 2016

(65) Prior Publication Data

US 2017/0309178 A1 Oct. 26, 2017

(30) Foreign Application Priority Data

Sep. 23, 2014 (DE) ........................ 10 2014 219 148

(51) Int. Cl.

| | |
|---|---|
| ***B60Q 1/00*** | (2006.01) |
| ***G08G 1/16*** | (2006.01) |
| ***G08G 1/005*** | (2006.01) |

(52) U.S. Cl.

CPC ............. *G08G 1/163* (2013.01); *G08G 1/005* (2013.01)

(58) Field of Classification Search

CPC ............. B60W 30/08; B60W 30/0956; B60W 30/095; G08G 1/166; G08G 1/16

(Continued)

(56) References Cited

U.S. PATENT DOCUMENTS

| | | | | |
|---|---|---|---|---|
| 9,424,468 B2 * | 8/2016 | Shimizu | G08G 1/166 | |
| 2011/0210866 A1 * | 9/2011 | David | G08G 1/163 340/903 | |

(Continued)

FOREIGN PATENT DOCUMENTS

| | | |
|---|---|---|
| DE | 10253192 A1 | 5/2004 |
| DE | 102008049824 A1 | 4/2010 |

(Continued)

OTHER PUBLICATIONS

International Search Report dated Nov. 18, 2015 of the corresponding International Application PCT/EP2015/067517 filed Jul. 30, 2015.

*Primary Examiner* — Toan N Pham

(74) *Attorney, Agent, or Firm* — Norton Rose Fulbright US LLP; Gerard Messina

(57) ABSTRACT

A method for setting up a movement model of a road user includes reading in a current movement vector of the road user, averaging movement vectors read in over of period of time to obtain a characteristic movement value of the road user for the period of time, and ascertaining a movement model using the movement value.

23 Claims, 4 Drawing Sheets

(58) Field of Classification Search
USPC ......... 340/435, 436, 903; 382/103, 104, 250
See application file for complete search history.

(56) References Cited

U.S. PATENT DOCUMENTS

| | | | | | |
|---|---|---|---|---|---|
| 2011/0246156 | A1* | 10/2011 | Zecha | G08G 1/166 703/6 |
| 2016/0101779 | A1* | 4/2016 | Katoh | G06T 7/60 340/435 |

FOREIGN PATENT DOCUMENTS

| | | | | |
|---|---|---|---|---|
| DE | 102008062916 | A1 | | 6/2010 |
| DE | 102009035072 | | * | 2/2011 |
| DE | 102009035072 | A1 | | 2/2011 |
| DE | 102012210202 | A1 | | 12/2013 |
| DE | 102013002284 | A1 | | 8/2014 |
| JP | 2007160076 | A | | 6/2007 |
| JP | 2008217429 | A | | 9/2008 |

* cited by examiner

METHOD AND DEVICE FOR SETTING UP A MOVEMENT MODEL OF A ROAD USER

CROSS-REFERENCE TO RELATED APPLICATIONS

The present application is the national stage of International Pat. App. No. PCT/EP2015/067517 filed Jul. 30, 2015, and claims priority under 35 U.S.C. § 119 to DE 10 2014 219 148.3, filed in the Federal Republic of Germany on Sep. 23, 2014.

FIELD OF THE INVENTION

The present invention relates to a method for setting up a movement model of a road user, to a corresponding device, and a corresponding computer program.

BACKGROUND

The document DE 10 2008 049 824 A1 describes a method for collision avoidance.

SUMMARY

Against this background, example embodiments of the present invention provide a method for setting up a movement model of a road user, and a device and computer-readable medium with a program for executing the method.

A movement of a road user, in particular a pedestrian, is able to be detected and represented in a movement vector. The movement vector represents accelerations and yaw rates that are acting on the road user at a sensor position. Multiple movement vectors within a period of time can be averaged for the purpose of smoothing numerical values of the movement vectors. The smoothed value may be used for optimizing a model of the movement. The model is able to be developed further on the basis of an average model in order to better represent idiosyncrasies of the road user.

According to an example embodiment of the present invention, a method for setting up a movement model of a road user includes: reading in a current movement vector of the road user; using movement vectors read in over a period of time in order to obtain a characteristic movement value of the road user for the particular period of time; and ascertaining the movement models using the movement value.

A movement model may be understood to describe a parameterized or computational representation of at least one movement. A road user, for example, may be a pedestrian, a bicyclist, a motorcycle, a motor vehicle or a truck. A movement vector represents a current movement in numerical values. The movement value may represent an acceleration or speed of the road user, for instance. In the step of using, the read-in movement vectors are able to be averaged in order to obtain the characteristic movement value. Averaging may be an application of a smoothing processing rule to the numerical values of at least two movement vectors. In addition or as an alternative, an ascertainment of the frequency and amplitude of typical periodic profiles in the movement vectors may take place in the step of using; these are likewise able to be utilized for ascertaining the movement model.

In an example, the steps of reading in and of using are executed anew in order to obtain a further movement value for a further period of time. To do so, the movement model is updated using the further movement value. The movement model is thereby able to be optimized in a step-by-step manner.

The method may include a step of ascertaining a future location of the road user while utilizing a current item of positional information of the road user, the current movement vector and the movement model. The movement model may be employed to calculate the probable location by using a current position and a current movement vector as input variables of the movement model.

The method may include a step of providing the future location, movement model, and/or the movement vector for at least one further road user located in a surrounding area. The step of providing may be carried out with the aid of an interface to a data-transmission network. The future location, the movement model and/or the movement vector is/are able to be supplied by way of a central server. With the aid of the supply, the further road user is able to ascertain an accident risk using its own future location, its own movement model and/or its own movement vector. A warning regarding the accident risk is able to be output. In a vehicle, a direct intervention in a vehicle control is possible in order to reduce and/or avert the accident risk.

Furthermore, in the step of providing, a signature of the road user is able to be made available in order to make the road user identifiable to the further road user. This avoids an incorrect allocation of the future location, movement model and/or the movement vector.

Read-in as movement vector may be a spatial acceleration and a spatial yaw rate of the road user. The acceleration and/or the yaw rate may be represented three-dimensionally. Great model accuracy is achievable by the three-dimensionality of the movement vector. In the same way, a skew position of the sensing sensor is able to be compensated by the three-dimensional movement vector.

An average acceleration for at least one characteristic movement sequence of the road user can be ascertained as characteristic movement value. The average acceleration may be a threshold value at which one movement sequence transitions to the other. For example, a transition from walking to running may take place starting from an average acceleration.

The approach introduced here furthermore creates an apparatus that is designed to carry out, actuate and/or implement the steps of a variant of a method shown here in corresponding devices. According to this example embodiment, the apparatus is likewise able to achieve the objective on which the present invention is based in a rapid and efficient manner.

In the case at hand, an apparatus may be understood to describe an electrical device which processes sensor signals and outputs control and/or data signal as a function thereof. The apparatus may include an interface which could be developed in the form of hardware and/or software. In case of a hardware development, the interfaces may be part of what is termed a system ASIC, for instance, which includes a variety of different functions of the apparatus. However, it is also possible that the interfaces are discrete integrated switching circuits or are at least partially made up of discrete components. In the case of a software development, the interfaces may be software modules, which are present on a microcontroller in addition to other software modules, for example.

According to an example embodiment, a computer program product or computer program having program code is stored on a machine-readable carrier or storage medium such as a semiconductor memory, a hard-disk memory or an optical memory and is used for the execution, implementation and/or actuation of the steps of the present method according to one of the example embodiments described herein, in particular with the program product or the program being executed on a computer or an apparatus.

The approach introduced here will be described in greater detail in the following text on the basis of the attached drawing.

DETAILED DESCRIPTION

Figure 1:
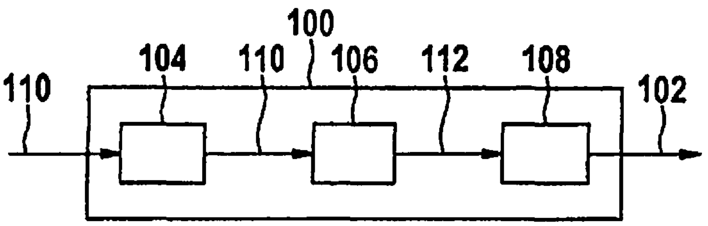
FIG. 1 a block diagram of a device for setting up a movement model of a road user according to an exemplary embodiment of the present invention.

In the following description of advantageous exemplary embodiments of the present invention, identical or similar reference numerals are used for the elements that are shown in the different figures and have a similar effect, and a repeated description of these elements is dispensed with.

FIG. 1 shows a block diagram of an apparatus 100 for setting up a movement model 102 of a road user according to an exemplary embodiment of the present invention. Apparatus 100 includes a device 104 for reading in, a device 106 for using, and a device 108 for ascertaining. Device 104 for reading in is designed to read in a current movement vector 110 of the road user. Device 106 for using is designed to use movement vectors 110 read in over a period of time in order to obtain a characteristic movement value 112 of the road user for the period of time. Device 108 for ascertaining is designed to ascertain movement model 102 while using movement value 112. Device 106 may be developed to average read-in movement vectors 110 or to ascertain typical periodic profiles in movement vectors 110 and to analyze the typical periodic profiles with regard to frequency and amplitude.

Figure 2:
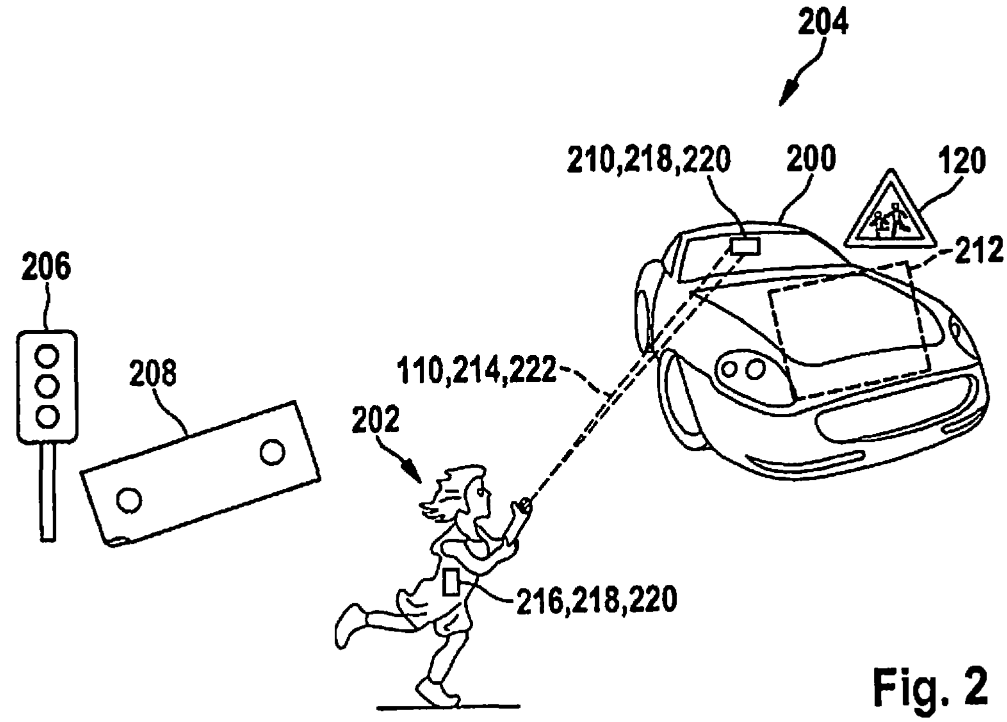
FIG. 2 an illustration of a plurality of road users in a traffic space that is monitored by a method for monitoring according to an exemplary embodiment of the present invention.

FIG. 2 shows an illustration of a plurality of road users 200, 202 in a traffic space 204, which is monitored by a method for monitoring according to an exemplary embodiment of the present invention. Here, a vehicle 200 represents a first road user 200. A second road user 202 is represented by a child 202 in this case. Both road users 200, 202 are moving within traffic space 204. Vehicle 200 is driving on a road, and child 202 is currently walking in the area of a sidewalk. However, child 202 is running in the direction of the street, which means there is the risk that child 202 may end up in front of moving vehicle 200.

In this instance, traffic space 204 includes exemplary infrastructure objects 206, 208, which in an exemplary embodiment of the method introduced here are used to transmit information about a looming danger for at least one of road users 200, 202 to road users 200, 202.

In the exemplary embodiment shown, vehicle 200 has a radio-based detection system 210. A plurality of antennas 212, which are able to emit and receive electromagnetic signals 214, are installed in vehicle 200 for this purpose. Because antennas 212 are spatially distributed across vehicle 200, a position of a signal source 216 of signal 214 relative to vehicle 200 is able to be calculated on the basis of runtime differences of a signal 214 received at a plurality of antennas 212. Detection system 210 is not restricted to objects that are situated within a direct line of sight to vehicle 200. Because the detection is carried out via radio waves 214, it is also possible to detect objects that are obstructed.

Here, child 202 is equipped with a device 216, which is developed as a signal source 216. For example, a radio reflector 216, adapted to a frequency of signal 214, is sewn into the clothing of child 202. In the same way, radio reflector 216 may be developed as a removable clip, which is fastened to the clothing of child 202.

Because mobile telephones have become very prevalent, a mobile telephone 216 of child 202 may be used as signal source 216. Here, signal 214 is received by at least one antenna of mobile telephone 216, internally processed and transmitted back to antennas 212 of vehicle 200 via the antenna.

In addition, vehicle 200 has a global satellite navigation system 218. A position of vehicle 200 in traffic space 204 is able to be ascertained in a highly precise manner via satellite navigation system 218. To improve the position ascertainment, vehicle 200 is equipped with inertial sensors 220. Because of inertial sensors 220, the position of vehicle 200 is able to be fixed with the aid of dead reckoning even if satellite navigation system 218 provides only limited positional accuracy. Since the position of vehicle 200 within traffic space 204 is known because of the use of satellite navigation system 218 and inertial sensors 220, an absolute position of child 202 in traffic space 204 is able to be ascertained using the relative position of child 202. Thus, the absolute position of child 202 is able to be localized on a digital map of traffic space 204, for instance. On that basis it can be determined whether child 202 is running from the sidewalk in the direction of the street or whether child 202 is running within a safe play area. In other words, a future position of child 202 is able to be determined. This future position is compared with dangerous regions of traffic space 204 in order to detect a danger to child 202 and/or vehicle 200. Here, a future position or a probable driving envelope of vehicle 200 defines the dangerous region. If child 202 were to continue running and thereby reach the driving envelope, there would be the acute risk that child 202 would be struck by vehicle 200. This danger is reported to a driver of vehicle 200 by a warning signal 120 so that the driver is able to respond to the danger.

In one exemplary embodiment, detection system 210 operates in a frequency range that provides for a large range for the detection of signal sources 216. This frequency range is a low-frequency range, in particular. When signal source 216, e.g., a mobile phone, is active, signal source 216 transmits further information 222 in addition to signal 214, in a different frequency range that has a lower range. This frequency range is a high-frequency range, in particular. Further information 222, for example, can be an item of positional information 110 and/or a movement vector 112 of signal source 216. Positional information 110 and/or movement vector 112 may be detected by inertial sensors 220 of mobile telephone 216 and alternatively or additionally, by a satellite navigation system 218 of mobile telephone 216.

Further information 222 is analyzed in vehicle 200 in order to improve a monitoring accuracy of traffic space 204.

For example, positional information 110 and/or movement vector 112, ascertained with the aid of mobile telephone 216, is/are compared with the position and/or the movement of child 202, as it has been detected by detection system 210. This makes it possible to increase the detection precision of the system as a whole.

In one exemplary embodiment, infrastructure objects 206, 208 include transmit units 216 and/or receive units 216 for at least one of signals 214 of detection unit 210. Since infrastructure objects 206, 208 are unable to move, the position of vehicle 200 is able to be ascertained with a high degree of precision on account of the ascertained relative position of vehicle 200 with respect to infrastructure objects 206, 208. It is likewise possible to exchange further information 222 via transmit units 216 and/or receive units 216. Information 222 is able to be exchanged between mobile signal sources 216 and infrastructure objects 206, 208 and also between vehicle 200 and infrastructure objects 206, 208. In other words, signal sources 216 in conjunction with detection device 210 form a data network.

Dead reckoning allows for the precise positioning of pedestrians 202 on the basis of GPS 218, the earth's magnetic field, motion sensors 220, and a digital map. Corresponding algorithms are able to be executed on current smartphones 216. In particular a classification of the movement into running, walking, and standing is able to take place.

In the approach presented here, an active pedestrian protection is realized based on a prediction of the pedestrian movement. A model for the transition from running to walking or standing, or in reverse, is utilized for this purpose so that a future location may be estimated. Based on this movement prediction, a collision is able to be predicted and an active pedestrian protection system possibly be activated on vehicle 200.

On smartphone 216, a precise position of pedestrian 202 is ascertained by dead reckoning. In addition, it is determined whether pedestrian 202 is running, walking or standing.

In parallel therewith, the transition behavior between running, walking and standing is ascertained on smartphone 216; in particular, an average acceleration, e.g., for a transition from running to standing is determined. The speeds that are typical for such are ascertained in addition. This takes place continuously across a longer period of time so that a movement model is finally obtained that individually applies to owner 202 of smartphone 216.

On the basis of the current pedestrian speeds and accelerations as well as from the identified pedestrian movement model, smartphone 216 then determines a potential location of pedestrian 202 and a location- and time-dependent presence probability within this area.

The predicted location, the pedestrian model, as well as the current positional, speed and acceleration vectors are transmitted to road users 200 in closer vicinity 204 with the aid of DSRC, for example. A digital signature ensures the authenticity of the transmitted data.

Surrounding vehicles 200 receive transmitted data 214 and are thereby able to select collision-endangered pedestrians 202. Sensors that sense the environment, e.g., radar and/or video, can be prepared for the presence of pedestrians 202 in a timely manner. For example, the sensors are able to be prepared for a pedestrian object that detaches from a visual obstruction. Tracking of pedestrian objects 202 may be started early on and may even be started when the sight is obstructed, thereby allowing for a more precise and faster ascertainment of speed 112 and position 110 once pedestrian 202 is within the visual range of the sensors.

In addition, the transmitted pedestrian model allows for a more precise and individual activation of an active pedestrian protection system. Specifically the percentage of incorrect triggerings is able to be reduced in this way when a pedestrian 202 of above average dynamics is involved, such as a jogger, who suddenly stops at the edge of the road more frequently. Furthermore, the system is able to intervene earlier and thus provide the difference between accident avoidance and collision through a speed reduction if a pedestrian of below average dynamic behavior is involved, such as an elderly pedestrian, who needs more time to move out of the driving envelope.

Vehicle 200 is also able to transmit its positional vectors 110, speed and acceleration vectors 112 or an already prepared estimate of the collision danger. Based on these data 214, smartphone 216 is able to warn pedestrian 202 by vibrating or by an acoustic signal. Furthermore, in case of a collision danger, an automatic operation of the horn of vehicle 200 may take place as a warning to pedestrian 202.

If a collision occurs following a critical approach between pedestrian 202 and vehicle 200, which is determined from transmitted data 214 and especially from acceleration-sensor data 112 of smartphone 216 and vehicle 200, smartphone 216 and vehicle 200 automatically place an emergency call.

If a high collision risk exists, especially the location and time of the (near) collision are transmitted to a Cloud in order to ascertain accident core areas and locations with a high accident risk. They may be transmitted back to smartphone 216 in order to warn pedestrians 202 of crossing the street at dangerous locations via an application, the warning consisting of a signal tone and/or vibrations, for example.

In other words, the approach described here allows for an active protection of road users 200, 202 that are at risk, in particular pedestrians 202, bicyclists and vehicle drivers 200, using a hybrid system with radio multi-frequency radio communication and location detection and/or micro-electro-mechanical system sensors 220.

An important traffic problem is backed by statistics of traffic accident data: The rate of killed and injured pedestrians 202 is high. As a result, there is a greater societal interest in protecting pedestrians.

In the avoidance of accidents for at-risk road users 202, the trend is toward active safety systems and passive safety systems for pedestrian protection.

The main goal is the active protection of at-risk road users 200, 202 by the avoidance of traffic collisions; in this regard the focus is specifically on pedestrian accidents in cities where the maximum speed of the vehicles is 50 km/h and the average pedestrian speed is ten to five km/h.

The reduction of traffic accidents involving unprotected road users 200, 202 is an important goal. Official numbers for 2009 indicate that more than 400,000 pedestrians 202 are killed worldwide every year as a result of traffic accidents.

Pedestrian collisions in the increasingly more intense traffic environment are taking place on a daily basis. For example, 16 percent of all persons killed in road traffic in Sweden are pedestrians. In the US, 11% of all people killed in road traffic are pedestrians. In Germany, the number is 13%, and in China it is up to 25%.

Moreover, accident statistics illustrate again and again that in approximately 40 percent of all fatal pedestrian accidents, the driver 200 does not see person 202 until shortly before the impact. In the case of children 202, the situation is even more dramatic. According to figures of the German Federal Bureau of Statistics from 2006, 48 percent of accident victims between the ages of six and 14 years ran into the street without paying attention to traffic. 25% of accidents involving children occur when they suddenly appear from behind an object that has obstructed the view.

Protection systems for avoiding collisions between cars and at-risk road users may be classified as video systems on the basis of visible near-infrared or far-infrared, mono- and stereo video cameras, radar-based systems, LIDAR (Light Detection and Ranging) and laser distance measuring systems, ultrasound-based systems, approaches based on global navigation satellite systems (GNSS) (e.g., assisted GPS, Galileo, etc.), local positioning system (LPS) or systems based on real-time position-finding (RTLS), RFID tag-based systems and UWB-based systems or position- and motion sensor systems.

The approach described here allows for possible detection, tracking and collision analysis of at-risk road users 200, 202 in situations where direct visual contact exists and in situations in which at-risk road user 200, 202 is hidden by an object, with a great range and high localization accuracy. At-risk road users 200, 202 are able to be detected, identified and tracked in poor weather such as rain or snow, or under poor light conditions. The use of active transponders 216 on at-risk road user 202 enlarges the range in the detection. This makes it possible to accurately identify the type of at-risk road user 202. Precise further information 222 of at-risk road users 202, such as 6D accelerations, 3D orientation, is able to be transmitted. This results in greater adaptability, flexibility and robustness of the system given different traffic scenarios, vehicles 200, and at-risk road users 202. The approach described here allows for an adaptive functionality of the active protection systems with regard to context, status, traffic conditions and profile of at-risk road user 202. A reliable and robust behavior of the system is obtained by a data-fusion process. Complementary MEMS sensors 220 improve the tracking of at-risk road users 202. The optional use of a global satellite navigation system 218 by at-risk road user 202 increases the availability, reliability and robustness of the corresponding system.

The optional communication via radio with traffic lights 206 at the edge of the road increases the availability, reliability and robustness of the system. The system is also able to operate autonomously without the aid of infrastructure means from the information and communications technology sector. A better risk estimate of collisions between vehicles 200 and weaker or endangered road users 202 is obtained by a data-fusion approach. It is possible to use local positioning systems 210 featuring greater accuracy on the basis of narrowband and ultra-wideband technology.

A system is introduced for the real-time detection, identification, localization and tracking of at-risk road users 200, 202 in region of interest 204 using a radio-frequency-based system, embedded in vehicle 200 and on at-risk road users 202, under LOS (line of sight) and NLOS (no line of sight) conditions.

The relative position between vehicle 200 and at-risk road users 202 is implemented in vehicle 200 and is based on a radio-frequency system. The most important parameters are the distance (range), horizontal angle (Azimuth) and vertical angle (elevation).

Better position-finding accuracy results from the combination of radio-frequency-based local positioning system 210 and positional data made available and transmitted by at-risk road user 202.

The vehicle-state vector, made up of the speed, the acceleration in six directions in space, the three-dimensional orientation, the position of global satellite navigation system 218, the steering-wheel position, and the setting of the flashing indicator, is evaluated.

The future vehicle trajectory is estimated using the steering-wheel position, the setting of the flashing indicator, the road and restrictions imposed by the sidewalk.

The state of at-risk road users 202 is evaluated inside vehicle 200 taking the 6D acceleration, the 3D orientation, and the position of the global satellite-navigation system into account. For example, it is possible to detect pedestrian states such as standing, walking, running, and walking up and down the sidewalk. By using an accelerometer 220, thrusts of the foot can be detected and used for identifying manners of walking of pedestrians 202.

The positional information of vehicle 200 and at-risk road user 202 from local positioning system 210 and global satellite navigation system 218 as well as the matching map information are used for the navigation and the related risk analysis.

In overcrowded situations, an evaluation of the global features of groups of at-risk road users 202 is able to be achieved.

A better orientation estimate and movement estimate of at-risk road users 202 is obtained by a supplementary data fusion from 3D acceleration sensor 220, 3D gyroscope, 3D compass, pressure sensor and the position of global satellite navigation system 218. This information is transmitted via radio 214 to vehicle 200.

The position estimate of at-risk road users 202 may be improved using additional vehicle sensors such as video, radar, lidar, ultrasound or radio-ultrasound systems.

Profile information such as age, personal status or handicap of the at-risk road user 202 is able to be transmitted to vehicle 200 in order to improve the risk evaluation and the actuation strategy.

Additional status information such as the physical state or the probable degree of intoxication of at-risk road user 202 is able to be transmitted to vehicle 200 in order to improve the accident-risk evaluation.

Context information about at-risk road users 202, such as children in the vicinity of a school or unusual events, may be transmitted to vehicle 200 to improve the movement prediction and be taken into consideration in the risk evaluation.

Context information about vehicle 200 and the environment such as day/night state, traffic conditions, weather and the average number of pedestrians 202 on streets 204 may be taken into account for the related risk analysis.

With the aid of data fusion, the profile, state and context of at-risk road users 202, the driver, vehicle 200 and the environment are able to be used for calculating the risk estimate and the actuation strategy.

Hierarchical and multi-level process information can be used to improve context-related functions. For example, primary information such as position, movement, time, identity, or secondary information such as spatial context, dynamic context, temporal context, physical correlation or traffic context may be utilized.

The system includes an electronically scanned antenna 212 and a local positioning system 210 based on a narrowband and ultra-wideband radio frequency using technology that is based on the signal propagation time and the arrival angle.

Figure 3:
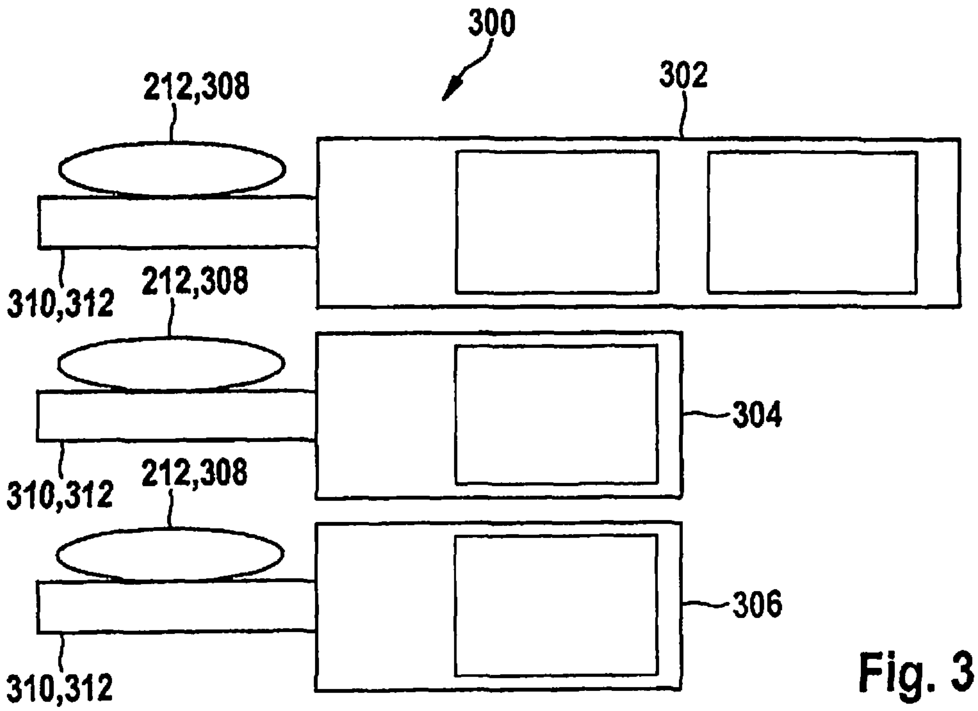
FIG. 3 an illustration of a system for monitoring a traffic space according to an exemplary embodiment of the present invention.

FIG. 3 shows an illustration of a system 300 for monitoring a traffic space according to an exemplary embodiment of the present invention. System 300 has at least one vehicle module 302, at least one mobile module 304, and at least one infrastructure module 306. System 300 shown here essentially corresponds to the components described in FIG. 2. Each module 302, 304, 306 has a first antenna 212 for a first frequency range as well as a second antenna 308 for a second frequency range. Antennas 308, 212 are connected to modules 302, 304, 306 via a communications interface 310 and a controller unit 312.

Vehicle module 302 has a local position-detection system, a global satellite navigation system, a triaxial compass, a triaxial accelerometer, a triaxial yaw sensor, a video camera, a radar transmitter and receiver, an RFID position-detection system, and a warning system. In addition, vehicle module 302 has a processor for joining and processing data. Warnings are able to be output onto a men-machine interface. The vehicle module may also include actuators for a direct intervention in a control of the vehicle.

Mobile module 304 has a transponder, a global satellite navigation system, a triaxial compass, a triaxial accelerometer, a triaxial yaw sensor, an RFID position-detection system, a warning system, as well as a battery.

Infrastructure module 306 includes a position-detection system, a camera, a radar transmitter and receiver, an RFID tag as well as a warning system.

A core point of active protection system 300 for at-risk road users is a modular, distributed architecture including a local positioning system (LPS), micro-electromechanical system (MEMS) sensors and possible cooperation with a global navigation satellite system (GNSS).

The used multi-frequency system operates in the narrowband and in the ultra-wideband in order to provide a radio communication between vehicles and at-risk road users. In addition, cooperation with the road infrastructure may take place via radio frequency in an effort to manage the complexity and diversity of the related scenarios involving at-risk road users.

The main advantage of the approach described here is an increased flexibility, reliability and robustness of the corresponding active protection system for at-risk road users.

A general, modularly distributed system 300 for carrying out the functions described here may include the following units:

An identification module, which detects and processes the static and dynamic information about at-risk road users. A communications module, e.g., based on the 802.11p communications standard. A local positioning module, e.g., based on 6 to 8.5 GHz ultra-broadband, as well as a position-tracking module, e.g., based on an expanded Kalman filter or a particle filter.

To improve the position estimate of the at-risk road users, the following auxiliary units are able to be integrated:

An inertia-measuring module, e.g., including a 3D microelectromechanical system (MEMS) of accelerometers and gyroscopes 3D. An orientation module, e.g., a 3D MEMS compass. A global navigation satellite system (GNSS) module, e.g., an A-GPS or multi-frequency Galileo as well as a position and navigation module.

In a more complex exemplary embodiment, system 300 includes distance sensors, e.g., a multi-beam radar or LIDAR, mono or stereo video cameras in the visible, near-infrared or far-infrared and/or an RFID-based positioning system, such as based on passive or active anchor nodes that are integrated into the infrastructure. The passive anchor nodes may be 13.56 MHz HF tags, for example.

In one exemplary embodiment, system 300 includes a distributed processing unit, which carries out the corresponding data-fusion process using the special features in a manner that is adapted to the status and context of the involved actors (vehicles, pedestrians, infrastructure, and environment). An algorithm estimates the trajectories of the vehicle and the involved at-risk road users and identifies critical situations. Involved at-risk road users use radio communication to transmit data pertaining to their type, position, orientation and state of inertia. Optical and graphical warnings, e.g., in a laser head-up display and/or sound warnings, may be output in the respective human-machine interface of vehicles. In critical situations, the horn is activated in addition, and an automatic full application of the brake is optionally generated in borderline situations. Augmented reality displays may be used to reinforce the respective warnings. Sound and/or vibration warnings may also be carried out in the modules carried by the at-risk road users. Supplementary optical and acoustic alarms are able to be generated from signals or units of the related infrastructure at the edge of the road, especially in some critical traffic zones.

Figure 4:
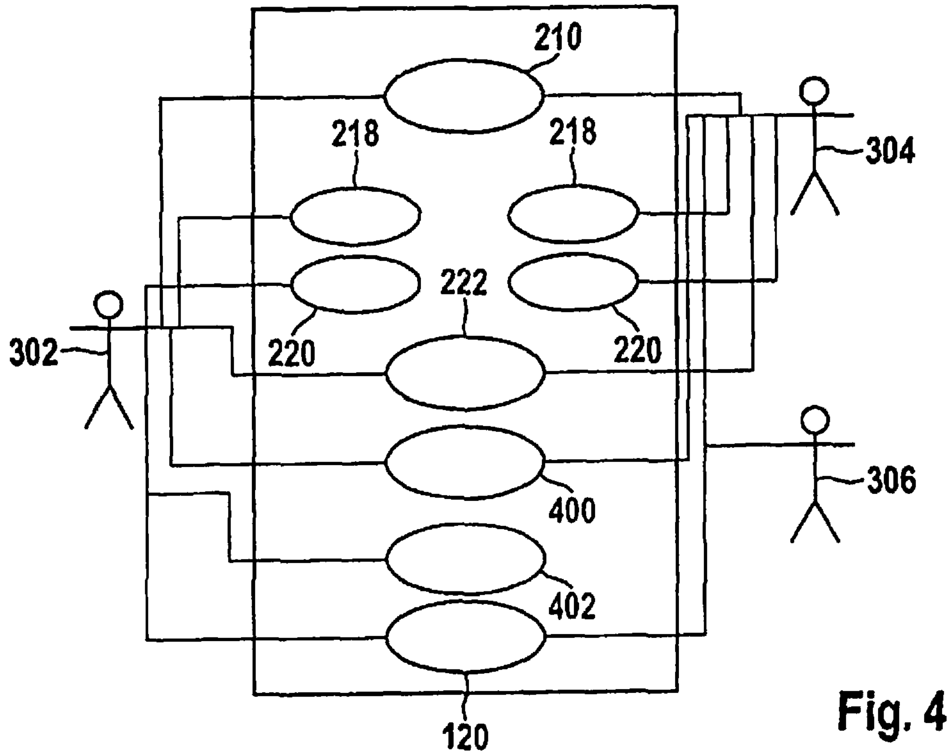
FIG. 4 a reference diagram of the components of a system for monitoring a traffic space according to an exemplary embodiment of the present invention.

FIG. 4 shows a reference diagram of the components of a system 300 for monitoring a traffic space according to an exemplary embodiment of the present invention. System 300 essentially corresponds to the system in FIGS. 2 and 3. Modules 302, 304, 306 of the system are represented by symbolic participants in this case. Vehicle module 302 has the greatest linkage with the other modules 304, 306. Vehicle module 302 communicates with mobile module 304 by way of the local positioning system or detection system 210, via further information 222 as well by as warning signals 120. Vehicle module 302 communicates with mobile module 304 in a risk management 400. Infrastructure module 306 communicates via the warning signals with vehicle module 302 as well as mobile module 304. Vehicle module 302 and mobile module 304 access respective own satellite navigation systems 218 and inertial sensors 220. The vehicle module may also access a brake 402 of the vehicle in order to decelerate the vehicle.

According to one exemplary embodiment, an adaptive and robust hybrid method for identifying, locating and tracking is involved. A risk estimate for reducing traffic accidents between vehicles and at-risk road users with line-of-sight and without line-of-sight conditions takes place. The involved risk-evaluation functions may define automatic control actions 402. For example, a driver warning, a reduction 402 of a vehicle speed, preparation of mechanical brake 402, an automatic activation of brake 402, and/or a haptic activation may take(s) place. In the same way, an at-risk road user may be warned by warning signals 120 and warnings at infrastructure 306. This method may also be used for the historical and continuous monitoring of risk conditions of at-risk road users in continuous improvement processes.

Figure 5:
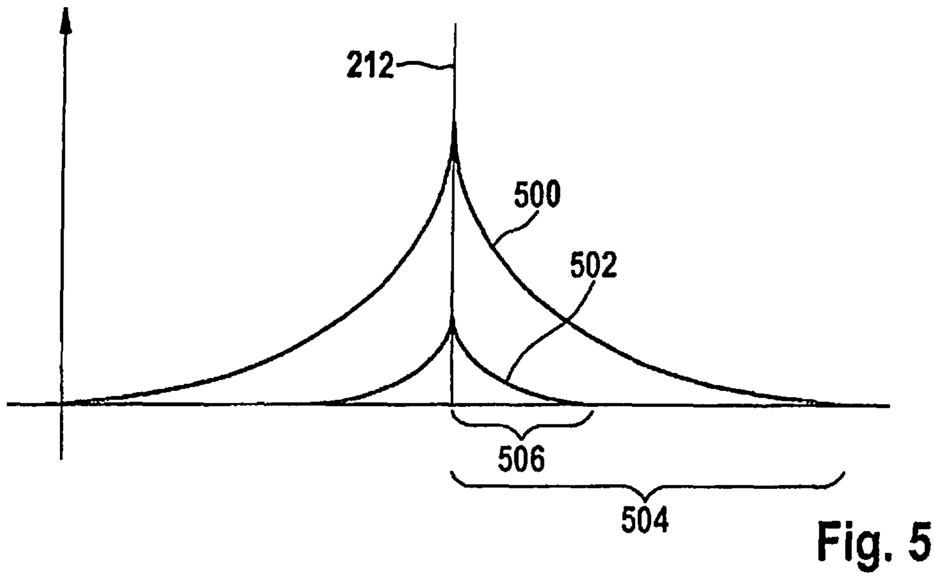
FIG. 5 shows intensity-distance characteristic curves of two different frequency bands according to an exemplary embodiment of the present invention.

FIG. 5 shows intensity characteristic curves 500, 502 of two different frequency bands according to an exemplary embodiment of the present invention. Intensity characteristic lines 500, 502 have been plotted in a diagram, in which a distance in meters has been plotted on its abscissa. The distance is symmetrically plotted in relation to a location of a transmitting antenna 212. A detectable signal intensity is plotted on the ordinate. The signal intensity in both frequency bands is maximal at the location of antenna 212 and drops with increasing distance from antenna 212. The signal intensity drops exponentially. First intensity characteristics curve 500 represents a first signal in a first frequency band having a low frequency. Second intensity characteristics curve 502 represents a second signal in a second frequency band having a higher frequency. The signal intensity of first signal 500 is significantly higher at antenna 212 than the signal intensity of second signal 502. Since both signals 500, 502 become exponentially weaker as the distance from the antenna decreases, second signal 502 drops below a detectable intensity at a lesser distance from antenna 212 than first signal 500. In this exemplary embodiment, first signal 500 drops below the detectable intensity at a first distance 504 of 150 meters. The second signal already drops below the detectable intensity at a second distance 506 of 50 meters.

In one exemplary embodiment, first signal 500 lies in the narrowband and is used for the exchange of information and for a rough position ascertainment. Second signal 502 lies in the ultra-broadband in one exemplary embodiment and is used for ascertaining the position. Second signal 502 is utilized for transmitting and receiving in the driving path of the vehicle and/or in the traffic lane of the vehicle.

In one exemplary embodiment, a frequency splitting approach using two carrier frequencies is used for different purposes. A first frequency 500 is an information frequency in the narrowband. A second frequency 502 is a positioning frequency in the ultra-broadband. Second frequency 502 is higher than first frequency 500 and is used in the pulse mode. First frequency 500 is lower than second frequency 502 and is used in the permanent mode.

In one exemplary embodiment, a wake-up mode or pulse mode is used when the information-frequency signal is available. This makes it possible to reduce interference problems in the pulse mode and the computational work.

In one specific embodiment, an ultra-wideband (UWB) is used in order to improve the range precision of the local positioning system, especially in the case of multi-path transmission scenarios.

In one specific embodiment, a Rotman lens is situated in the vehicle in order to provide a multiple-beam antenna featuring different angle orientations with a suitable amplification and an ultra-wideband capability.

In one specific embodiment, two or more Rotman lenses are used to provide a complementary positioning method by the angle of arrival (AOA) or the time of arrival (TOA).

In one specific embodiment, the at-risk road users are provided with a radio-frequency transmit and receive unit for the configuration, the transmission of real-time information, and localization.

In one specific embodiment, the road users deemed at risk are informed about an accident risk by the emission unit via a human/machine interface (HMI), e.g., a mobile telephone.

In one specific embodiment, a risk evaluation involving groups of at-risk road users is employed; for example, pedestrians in the area of a traffic light or an intersection are evaluated jointly.

In one specific embodiment, the real-time localization of at-risk road users is dynamically categorized into "with sight connection" and "without sight connection", in order to improve the identification, localization, tracking and the related risk-evaluation function.

In case of a temporary radio-frequency occlusion of an at-risk user, the system offers still further possibilities of tracking the radio frequency of the affected road user at risk. It is possible to use a multi-frequency system that is adapted to the situation at hand. Higher or lower carrier frequencies may be used in order to improve the propagation and localization via radio. The different behaviors of the various frequency signals of a radio frequency emitter are able to be compared during a vehicle movement. Two different carrier frequencies may be used to compare runtime differences and to enable a plausibility check. A number of hypotheses for the propagation of radio waves can be considered for tracking the respective at-risk road users. The properties of reflected signals are able to be analyzed because they display a different behavior than directly received signals.

Figure 6:
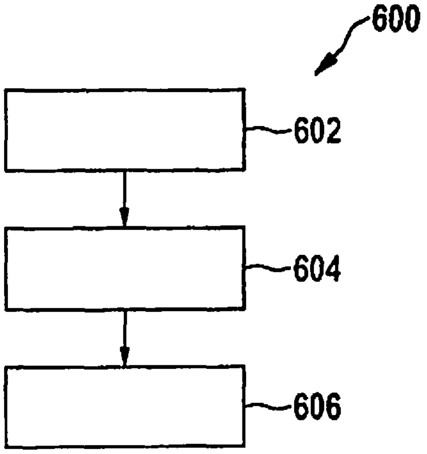
FIG. 6 a flow diagram of a method for setting up a movement model of a road user according to an exemplary embodiment of the present invention.

FIG. 6 shows a flow chart of a method 600 for setting up a movement model of a road user according to an exemplary embodiment of the present invention. Method 600 has a step 602 of reading in, a step 604 of using, and a step 606 of ascertaining. In step 602 of reading in, a current movement vector of the road user is read in. In step 604 of using, movement vectors read in over a period of time are averaged in order to obtain a characteristic movement value of the road user for the period of time. In step 606 of ascertaining, the movement model is ascertained with the aid of the movement value.

In one exemplary embodiment, steps 602, 604 of reading in and using are carried out anew in order to obtain a further movement value for a further period of time. The movement model is updated in step 606 of ascertaining using the further movement value.

In one exemplary embodiment, a spatial acceleration and a spatial yaw of the road user are read in as the movement vector.

Figure 7:
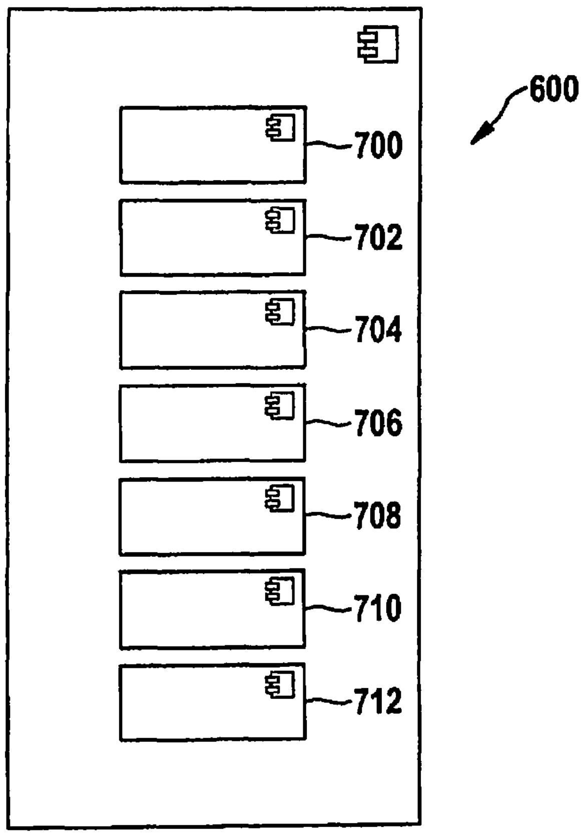
FIG. 7 illustrates a method sequence of a method for monitoring a traffic space according to an exemplary embodiment of the present invention.

FIG. 7 shows a representation of a method sequence of a method 600 for monitoring a traffic space according to one exemplary embodiment of the present invention. An identification 700 of an object, a position detection 702 of the object, tracking 704 of the object, communication 706 with the object, a data fusion 708, a risk management 710, and a warning 712 via a men/machine interface take place.

The method introduced here allows for real-time tracking of at-risk road users 202 while considering an inertia-measuring unit and/or an orientation-measuring unit, such as a combined 3D orientation or 3D-gyro and 3D acceleration.

In one further application of the approach described here, systems embedded in the infrastructure are used for detecting and warning the at-risk road users.

In one specific embodiment, infrastructure radio receiver-emitter units and other infrastructure sensors are used for collecting information about road users at risk, vehicles and the road state in order to provide information about the risks via radio. For instance, this information may be used for activating a warning lamp at a traffic light or for a transmission via radio to surrounding vehicles or at-risk road users.

In one specific embodiment, an optical and/or acoustic warning is provided to the driver in case of an accident risk. Further support on the part of the ESP such as a brake preparation is possible provided a possible driver reaction consists of braking. An active intervention such as braking and/or steering is possible in order to avoid accidents and/or to lessen their effect.

The exemplary embodiments described and shown in the figures have been selected merely by way of example. Different exemplary embodiments may be combined completely or with regard to individual features. An exemplary embodiment may also be supplemented by features of a further exemplary embodiment. In addition, the method steps introduced here are able to be repeated and to be carried out in a sequence other than the one described.

If an exemplary embodiment includes a "and/or" linkage between a first feature and a second feature, then this is meant to indicate that the exemplary embodiment according to one specific embodiment may have both the first feature and the second feature, and according to another specific embodiment, may include either only the first feature or only the second feature.

What is claimed is:

1. A method for setting up a movement model of a road user for a transition from running to walking or standing or vice versa, the method comprising:

at each of a plurality of moments over a period of time, reading in, by processing circuitry, a respective current movement vector of the road user, to obtain a plurality of movement vectors;

using, by the processing circuity, the plurality of movement vectors to obtain a characteristic movement value of the road user for the period of time; and ascertaining, by the processing circuitry, the movement model using the movement value;

wherein as the characteristic movement value, an average acceleration for at least one characteristic movement sequence of the road user and speeds typical for this are ascertained continuously over a longer time period to prepare the movement model that is valid for the road user, and wherein the characteristic movement sequence represents the transition from running to walking or standing or vice versa.

2. The method of claim 1, further comprising:

repeating the reading in and the using to obtain a further movement value for a further period of time; and updating the movement model the further movement value.

3. The method of claim 1, further comprising:

ascertaining a future location of the road user using a current item of positional information of the road user, a most recently read in one of the plurality of movement vectors, and the movement model.

4. The method of claim 3, further comprising:

providing the future location for at least one further road user located in a surrounding area.

5. The method of claim 4, wherein the providing includes supplying a signature of the road user in order to make the road user identifiable to the further road user.

6. The method of claim 1, further comprising:

providing at least one of the movement model and a most recently read in one of the plurality of movement vectors for at least one further road user located in a surrounding area.

7. The method of claim 6, wherein the providing includes supplying a signature of the road user to make the road user identifiable to the further road user.

8. The method of claim 1, the reading in of the movement vectors includes reading a spatial acceleration and a spatial yaw rate of the road user.

9. The method of claim 1, wherein a Rotman lens is situated in a vehicle to provide a multiple-beam antenna featuring different angle orientations with a suitable amplification and an ultra-wideband capability.

10. The method of claim 1, wherein a plurality of Rotman lenses are used to provide a complementary positioning method by an angle of arrival (AOA) or a time of arrival (TOA).

11. The method of claim 1, wherein data is communicated between the road user and the processing circuitry using at least two difference frequency bands, wherein a first frequency in a narrowband is used in a permanent mode for exchanging information or ascertaining a rough position, and wherein a second frequency in an ultra-broadband is used in a pulse mode to ascertain accurate position information.

12. An apparatus for setting up a movement model of a road user for a transition from running to walking or standing or vice versa, the apparatus having the following features:

a data storage arrangement; and processing circuitry;

wherein the processing circuitry is configured to perform the following:

at each of a plurality of moments over a period of time, read in a respective current movement vector of the road user, thereby obtaining a plurality of movement vectors;

store the obtained plurality of movement vectors in the data storage arrangement: use the plurality of movement vectors to obtain a characteristic movement value of the road user for the period of time; and ascertain the movement model using the movement value;

wherein as the characteristic movement value, an average acceleration for at least one characteristic movement sequence of the road user and speeds typical for this are ascertained continuously over a longer time period to prepare the movement model that is valid for the road user, and wherein the characteristic movement sequence represents the transition from running to walking or standing or vice versa.

13. The apparatus of claim 12, wherein the processing circuitry is further configured to perform the following:

repeating the reading in and the using to obtain a further movement value for a further period of time; and updating the movement model the further movement value.

14. The apparatus of claim 12, wherein the processing circuitry is further configured to perform the following:

ascertaining a future location of the road user using a current item of positional information of the road user, a most recently read in one of the plurality of movement vectors, and the movement model.

15. The apparatus of claim 14, wherein the processing circuitry is further configured to perform the following:

providing the future location for at least one further road user located in a surrounding area.

16. The apparatus of claim 15, wherein the providing includes supplying a signature of the road user in order to make the road user identifiable to the further road user.

17. The apparatus of claim 12, wherein the processing circuitry is further configured to perform the following:

providing at least one of the movement model and a most recently read in one of the plurality of movement vectors for at least one further road user located in a surrounding area.

18. The apparatus of claim 17, wherein the providing includes supplying a signature of the road user to make the road user identifiable to the further road user.

19. The apparatus of claim 12, the reading in of the movement vectors includes reading a spatial acceleration and a spatial yaw rate of the road user.

20. The apparatus of claim 12, wherein a Rotman lens is situated in a vehicle to provide a multiple-beam antenna featuring different angle orientations with a suitable amplification and an ultra-wideband capability.

21. The apparatus of claim 12, wherein a plurality of Rotman lenses are used to provide a complementary positioning method by an angle of arrival (AOA) or a time of arrival (TOA).

22. The apparatus of claim 12, wherein data is communicated between the road user and the processing circuitry using at least two difference frequency bands, wherein a first frequency in a narrowband is used in a permanent mode for exchanging information or ascertaining a rough position, and wherein a second frequency in an ultra-broadband is used in a pulse mode to ascertain accurate position information.

23. A non-transitory computer-readable medium having a computer program, which is executable by a processor, comprising:

a program code arrangement having program code for setting up a movement model of a road user for a transition from running to walking or standing or vice versa, by performing the following:

reading in, at each of a plurality of moments over a period of time, a respective current movement vector of the road user, so as to obtain a plurality of movement vectors;

obtaining, via the processor, a characteristic movement value of the road user for the period of time using the plurality of movement vectors; and ascertaining, via the processor, the movement model using the movement value;

wherein as the characteristic movement value, an average acceleration for at least one characteristic movement sequence of the road user and speeds typical for this are ascertained continuously over a longer time period to prepare the movement model that is valid for the road user, and wherein the characteristic movement sequence represents the transition from running to walking or standing or vice versa.

* * * * *